United States Patent
Chen et al.

(10) Patent No.: US 6,658,006 B1
(45) Date of Patent: Dec. 2, 2003

(54) SYSTEM AND METHOD FOR COMMUNICATING DATA USING MODIFIED HEADER BITS TO IDENTIFY A PORT

(75) Inventors: David X. Chen, Plano, TX (US); Edward T. Sullivan, Highland Village, TX (US); Alexander A. Smith, Carrollton, TX (US); Gary F. Chard, Richardson, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/326,142

(22) Filed: Jun. 3, 1999

(51) Int. Cl.[7] .............................................. H04L 12/56
(52) U.S. Cl. .................................... 370/395.1; 370/392
(58) Field of Search .............................. 370/389, 395.1, 370/354, 466, 352, 353, 355, 356, 392

(56) References Cited

U.S. PATENT DOCUMENTS

| | | | |
|---|---|---|---|
| 4,339,633 A | 7/1982 | Ahmed | 179/99 M |
| 4,631,641 A | 12/1986 | Brombal et al. | 361/424 |
| 4,893,306 A | 1/1990 | Chao et al. | 370/94.2 |
| 5,012,469 A | 4/1991 | Sardana | 370/95.3 |
| 5,278,833 A | 1/1994 | Crisler et al. | 370/95.1 |
| 5,295,140 A | 3/1994 | Crisler et al. | 370/94.1 |
| 5,303,234 A | 4/1994 | Kou | 370/85.2 |
| 5,412,652 A | 5/1995 | Lu | 370/85.12 |
| 5,467,348 A | 11/1995 | Fujii et al. | 370/60.1 |
| 5,515,376 A | 5/1996 | Murthy et al. | 370/85.13 |
| 5,677,905 A | 10/1997 | Bigham et al. | 370/94.2 |
| 5,689,506 A | 11/1997 | Chiussi et al. | 370/388 |
| 5,712,851 A | 1/1998 | Nguyen et al. | 370/399 |
| 5,771,234 A | 6/1998 | Wu et al. | 370/396 |
| 5,796,720 A | 8/1998 | Yoshida et al. | 370/245 |
| 5,805,568 A | 9/1998 | Shinbashi | 370/223 |
| 5,838,924 A | 11/1998 | Anderson et al. | 395/200.69 |
| 5,867,502 A | 2/1999 | Chang | 370/477 |
| 5,920,412 A | 7/1999 | Chang | 359/128 |
| 5,982,776 A | 11/1999 | Manning et al. | 370/414 |
| 5,999,531 A | * 12/1999 | Ferolito et al. | 370/390 |
| 6,067,301 A | 5/2000 | Aatresh | 370/418 |
| 6,144,669 A | 11/2000 | Williams et al. | 370/401 |
| 6,233,074 B1 | * 5/2001 | Lahat et al. | 359/118 |
| 6,519,064 B1 | * 2/2003 | Fatehi et al. | 359/130 |

FOREIGN PATENT DOCUMENTS

| | | | |
|---|---|---|---|
| EP | 0 509 648 A1 | 10/1992 | H04L/12/56 |
| EP | 0 680 235 A1 | 11/1995 | H04Q/11/04 |
| EP | 0 700 186 A1 | 3/1996 | H04L/12/56 |
| EP | 0 817 439 A2 | 1/1998 | H04L/12/56 |
| EP | 0 818 940 A2 | 1/1998 | H04Q/11/04 |
| EP | 0 868 058 A1 | 9/1998 | H04L/12/56 |
| EP | 0 901 307 A2 | 3/1999 | H04Q/11/04 |
| WO | WO 99/09689 | 2/1999 | H04J/3/16 |

OTHER PUBLICATIONS

"General Aspects of Digital Transmission Systems," XP–002083788, ITU–T Recommendation G.708, *ITU–T Telecommunication Standardization Section of ITU*, Mar., 1993, 19 pages.

(List continued on next page.)

*Primary Examiner*—Kenneth Vanderpuye
(74) *Attorney, Agent, or Firm*—Baker Botts L.L.P.

(57) ABSTRACT

A system includes a communication device that includes a number of interface cards and a switching complex. Upon receiving a data signal, an input card modifies header bits of the data signal to identify an input port on which the data signal was received. The switching complex uses the modified header bits to communicate the data signal to an output card and associated output port. In a particular embodiment, the switching complex may also modify header bits to identify the input card.

17 Claims, 7 Drawing Sheets

OTHER PUBLICATIONS

International Search Report in International Application No. PCT/US00/15331, dated Aug. 31, 2000, 6 pages.

Wu, et al., "A Broadband Virtual Path SONET/ATM Self–Healing Ring Architecture and Its Economic Feasibility Study," *IEEE Global Telecommunications Conference*, Dec. 6–9, 1992, 8 pages.

Tsong–Ho Wu, "Cost–Effective Network Evolution, A three–phase path from todays SONET/STM ring transport to a SONET/ATM VP ring transport could facilitate the network evolution for broadband service," *IEEE Communications Magazine*, Sep. 1993, 10 pages.

M.Huterer, "ATM on SDH," *Alcatel Telecommunications Review*, 1st Quarter, 1997, 9 pages.

PCT Written Opinion In International Application No. PCT/US00/15426, dated Jun. 26, 2001, 5 pages.

Tai H. Noh, ATM Scenarios for SDH/SONET Networks, XP–000750438, *Bell Labs Technical Journal*, Jan.–Mar. 1998, 13 pages.

International Search Report in International Application No. PCT/US 00/15426, dated Sep. 21, 2000, 7 pages.

International Search Report in International Application No. PCT/US 00/15425, dated Sep. 7, 2000, 6 pages.

Kurimoto, et al., An Expandable Multicast ATM Switch Based on Copy Trunk with New Delay Control and Cell Spacing Functions, XP 000628644, *IEICE Trans. Commun.*, vol. E79B, No. 8, Aug., 1996, 7 pages.

Subramaniam, et al., Multicasting in ATM networks using MINs[1], *Computer Communications 19*, 1996, 11 pages.

International Search Report in International Application No. PCT/US00/15336, dated Sep. 4, 2000, 7 pages.

PCT International Search Report in International Application No. PCT/US00/15337, dated Aug. 24, 2000, 7 pages.

K. Sriram,"Methodologies for bandwidth allocation, transmission scheduling, and congestion avoidance in broadband ATM networks," *Computer Networks and ISDN Systems*, vol. 26, No. 1, Sep., 1993, 17 pages.

Fabrice Guillemin, et al., "Some Traffic Aspects in Virtual Private Networks over ATM," XP–000702583, Source Unknown, Apr., 1996, 12 pages.

Noriharu Miyaho, et al., "Integrated Switching Architecture and Its Traffic Handling Capacity in Data Communication Networks," XP 000692355, *IEEE Trans Commun.*, vol. E79–B, No. 12, Dec., 1996, 13 pages.

International Search Report in International Application No. PCT/US 00/15131, dated Sep. 7, 2000, 6 pages.

McDysan, David E., et al., *ATM Theory and Application*. McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., *ATM User–Network Interface Specification, Version 3.1*, The ATM Forum, Sep., 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec., 1998.

"Product Design Specification (PDS) for FLASH–192, Release 1, " Internal Design Specification for Product, pp. 1/916; 4–12/9161 315–320/916, Product publicly released on or about Mar., 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep., 1999.

"The ÁnyMedia™ Access System Anything's Possible," Lucent Technologies, Inc. Marketing Communications, 1997.

Photography of Northern Telecom Card, card dated Apr., 1998.

Held, G., *Understanding Data Communications*, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar., 1991.

"Draft New Recommendation I.630 (ATM Protection Switching)," ITU Telecommunication Standardization Sector, COM 13–41–E, Sep., 1998.

Guérin, R., et al., "Equivalent Capacity and its Application to Bandwidth Allocation in High–Speed Networks," IEEE Journal on Selected Areas in Communications, vol. 9, No. 7, pp. 968–981, Sep., 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

*Universal Serial Bus Specification Revision 1.1*, Compaq Computer Corporation, Intel Corporation, Microsoft Corporation, NEC Corporation, Sep. 23, 1998.

"MMC Products," http://www.mc–net.com/top–roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

"MMC Network's Products: AnyFlow 5500," http://www.mmcnet.com/Solutions/anyflow5500.asp, Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8×8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8×8 Non–Blocking Single Chip Switch Controller, Preliminary IDT77V500, Commercial Temperature Range, Integrated Device Technology, Inc., pp. 1–14, May, 1998.

Giroux, Natalie et al., *Traffic Management Specification, Version 4.0*, af–tm–0056.000, The ATM Forum, Apr., 1996.

*M4 Interface Requirements and Logical MIB*, af–nm–0020.000, The ATM Forum, Oct., 1994.

* cited by examiner

US 6,658,006 B1

SYSTEM AND METHOD FOR COMMUNICATING DATA USING MODIFIED HEADER BITS TO IDENTIFY A PORT

TECHNICAL FIELD OF THE INVENTION

This invention relates generally to the field of data communications, and more specifically to a system and method for communicating data using modified header bits to identify a port.

BACKGROUND OF THE INVENTION

Telecommunication systems are ubiquitous in our society. The development of new technologies and investment in new infrastructure has increased the connectivity and availability of data service to consumers. One common data communication protocol called asynchronous transfer mode (ATM) communicates data in relatively small portions known as cells. In a particular embodiment, these cells may then be included in a synchronous transport signal (STS) associated with a variety of networks having a linear or ring topology, such as a synchronous optical network (SONET).

These networks may include a multiplexer or other communication device that supports a variety of interface cards for receiving data signals from the network and forwarding these data signals to other components in the network. The multiplexer also includes a switch fabric that receives these data signals from the interface cards, determines their destination, and forwards the data signals to the interface cards for communication to other components in the network. The ports of the switch fabric may operate at a higher rate than the ports of the interface cards.

SUMMARY OF THE INVENTION

In accordance with the present invention, a system and method for communicating data is provided that substantially eliminates or reduces disadvantages or problems associated with previously developed systems and methods. In particular, the present invention contemplates a communication device having at least one input card that modifies header bits of a received data signal to identify a corresponding input port. This identification of the input port for the data signal allows for a more efficient and effective operation of the underlying switch fabric of the communication device.

In one embodiment of the present invention, a communication device includes a first card that receives a data signal at an input port and modifies header bits of the data signal to identify the input port. A switch fabric coupled to the first card receives the data signal and modifies the header bits to identify an output port of a second card. The second card couples to the switch fabric and transmits the data signal on the output port.

In another embodiment of the present invention, a communication device includes a first card that receives a data signal at an input port and modifies header bits of the data signal to identify the input port. A timeslot interchange couples to the first card and maps the data signal to a higher speed signal having other data signals from other input ports to produce an aggregate signal. A switch fabric couples to the timeslot interchange and receives the data signal in a timeslot associated with the first card. This switch fabric modifies the header bits to identify an output port of a second card, and the second card transmits the data signal on the output port.

In still another embodiment of the present invention, an interface card of a communication device includes a first port that receives a data signal having header bits. A processor couples to the first port and modifies the header bits to identify the first port. A second port transmits the data signal with the modified header bits.

Technical advantages of the present invention include a system and method that modify the header bits of a data signal to perform effective and efficient switching of the signal. In a particular embodiment, the present invention is applied to a communication device in a data network, such as an add/drop multiplexer, that includes interface cards and a switch fabric. The interface cards modify and recognize header bits to identify input and/or output ports for the data signals. In addition, the switch fabric may modify the same or other header bits to identify interface cards that receive and/or transmit the data signals. Due to the port and/or card identification function, the position of each interface card is slot independent relative to the position of the switch port. This allows maximum flexibility for slot positioning for interface cards within one or more shelves of the communication device. Also, the identification of ports using modified header bits maximizes utilization of higher speed switch ports by allowing for aggregation of lower speed signals received from the interface cards into higher speed signals for presentation to the switch fabric.

Further advantages of the present invention include adapting these inventive techniques to communicate asynchronous transfer mode (ATM) cells by modifying the general flow control field (GFC), the virtual path identifier (VPI), the virtual channel identifier (VCI), or any other header bits or fields of the ATM cell. Within an add/drop multiplexer or other communication device, the interface cards may support, for example, STS-1 or STS-3c signals carrying ATM cells whereas the ATM switch fabric may support STS-12, STS-48, or higher speed signals. In such a case, modification of header bits allows the device to aggregate lower speed signals received at the interface cards into a higher speed aggregate signal for presentation to the ATM switch fabric. This aggregation of signals from multiple ports, multiple interface cards, or both provides for a more efficient and effective operation of the ATM switch fabric. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
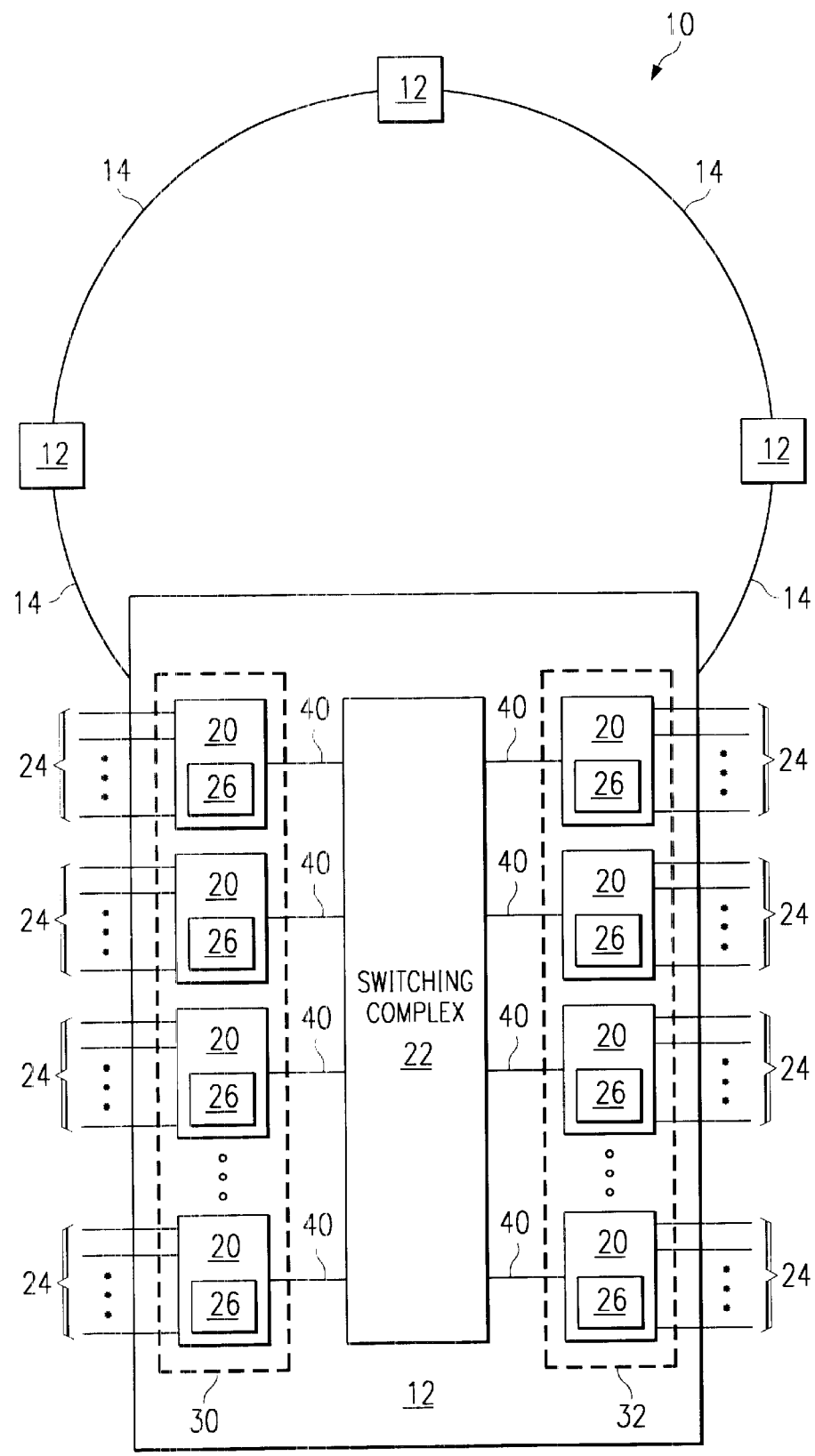
FIG. 1 illustrates a network having a communication device constructed and operating in accordance with the present invention.

FIG. 1 illustrates a communication system 10 that includes a number of communication devices 12 that transmit and receive information using network 14. Communication device 12 includes a number of interface cards 20 and a switching complex 22. In operation, communication device 12 modifies header bits of data signals to identify cards 20 and/or their associated ports to maximize utilization of the resources of switching complex 22.

Each card 20 in communication device 12 includes at least one physical port 24 that represents a single wireline or wireless external link to card 20, and at least one port 40 that represents a physical or logical link to switching complex 22. Each card 20 can receive and transmit data signals over each of its ports 24. For example, card 20 may receive a data signal on one of its ports 24 and forward the data signal to switching complex 22 using port 40. Similarly, card 20 may receive a data signal on port 40 and transmit the data signal to network 14 using one of its ports 24. Each card 20 also includes a processor 26 implemented in hardware, software, or both that controls the overall operation of card 20. In a particular embodiment, processor 26 modifies and recognizes header bits of data signals to identify ports 24.

Cards 20 may perform service functions, transport functions, or both. For example, cards 20 may support a variety of optical carrier (OC) interfaces (e.g., OC-1, OC-3c, etc.), a variety of electrical carrier (EC) or digital signal (DS) interfaces (e.g., EC-1, DS-1, DS-3, etc.), local area network (LAN) interfaces (e.g., Ethernet, token ring, etc.), frame relay, cell relay, X.25, and any other suitable interface that communicates data. In a particular embodiment, ports 24 and 40 of cards 20 are relatively lower speed ports in comparison to higher speed switch ports in switching matrix 22. The term "data signals" contemplates any data, voice, video, or other information communicated by interfaces supported by cards 20.

For illustrative purposes only, communication device 12 includes a grouping 30 of cards 20 representing an input function of communication device 12 and a grouping 32 of cards 20 representing an output function of communication device 12. Since each card 20 in communication device 12 provides both input and output functions, grouping 32 may be viewed as a duplication of cards 20 in grouping 30 to separate illustratively the input and output functions of cards 20. Another representation of communication device 12 may be a single line of cards 20 providing both input and output functions mounted in one or more shelves with switching complex 22. Since the terms "input card" and "output card" are used to designate the particular function performed by card 20, a single card 20 in communication device 12 may be both an input card and an output card for the same data signal.

Switching complex 22 includes both voice and data switching capabilities and may support synchronous optical network (SONET) transport, asynchronous transfer mode (ATM) switching and multiplexing, and local area network (LAN) technologies in one network element. Communication device 12 provides dialable ATM, synchronous transport mode (STM), and virtual tributary (VT) support with modular and redundant capabilities as well as line protection. In a particular embodiment as an add/drop multiplexer, cards 20 in communication device 12 provide a transport capability to communicate data signals to other communication devices 12 using network 14 and a service capability to users of system 10.

Although network 14 is illustrated in FIG. 1 as a ring connecting multiple communication devices 12, network 14 may be any suitable ring or linear topology, or other collection of communication devices using wireline or wireless communication technologies. In a particular embodiment, network 14 may be a SONET that supports a variety of signals, such as OC-3, OC-12, OC-48, and others. Also, network 14 in conjunction with communication devices 12 supports a number of line protection and tributary protection schemes such as unidirectional path switched ring (UPSR), bidirectional line switched ring (BLSR), or any other suitable protection or redundancy scheme. Devices in system 10 may be managed using a wide range of management interfaces, such as transaction language (TL-1), simple network management protocol (SNMP), common management information protocol (CMIP), or other suitable network management scheme.

In operation, communication devices 12 in system 10 communicate data signals using network 14. An input card 20 receives a data signal, such as an ATM cell, at an input port 24 coupled to input card 20. The data signal includes both header bits and a data payload. For example, an ATM cell is a fifty-three byte structure that includes a forty-eight byte payload and a five byte header. Input card 20 modifies all or a portion of the header bits to identify input port 24. Switching complex 22 then receives the data signal with modified header bits and performs aggregation, switching, and/or multiplexing functions using the modified header bits. During this process, switching complex 22 may also modify certain header bits to identify input card 20 that received the data signal from network 14. Upon determining an output card 20 and associated output port 24, switching complex 22 may modify header bits to identify output card 20 and/or output port 24. Upon receiving the data signal from switching complex 22, output card 20 recognizes the modified header bits as identifying output port 24 and transmits the data signal over output port 24.

The modification of header bits provides several technical advantages. Cards 20 may contain one or more individual lower speed ports 24 that may be mapped to a higher speed port in switching complex 22. Due to the port and/or card identification function, the position of each card 20 is slot independent relative to the position of switch ports in switching complex 22. This allows maximum flexibility for slot positioning for cards 20 within one or more shelves of communication device 12. Also, the identification of ports using modified header bits maximizes utilization of higher speed switch ports of switching complex 22 by allowing for the aggregation of lower speed signals received from cards 20 into higher speed signals for presentation to switching complex 22.

Figure 2:
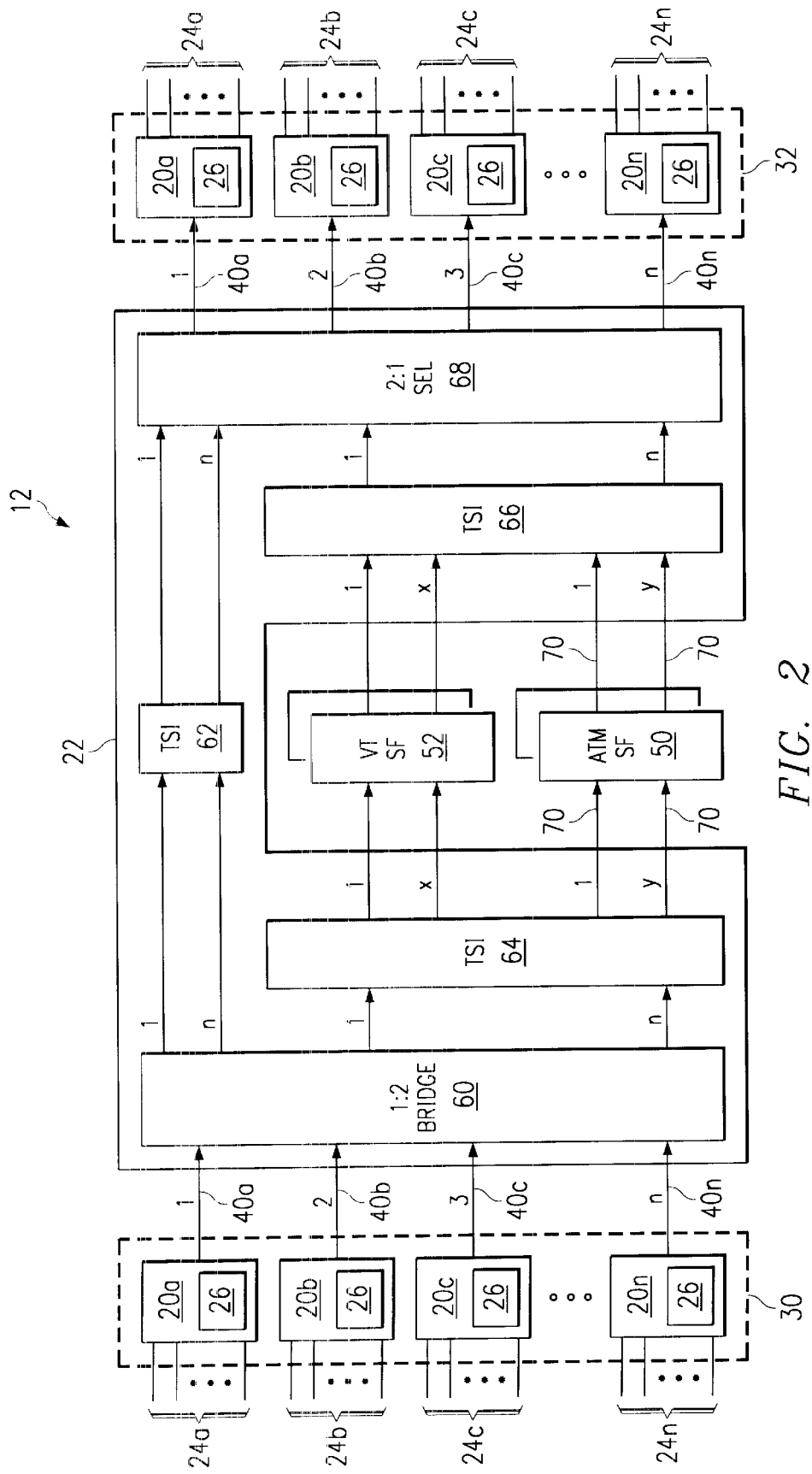
FIG. 2 illustrates in more detail the communication device.

FIG. 2 illustrates in more detail communication device 12. Again, for illustrative purposes, cards 20 that receive and transmit data signals, are duplicated in groupings 30 and 32 to illustrate more clearly the flow of data signals in communication device 12. For example, card 20a includes ports 24a that may be used to receive data signals (as illustrated by grouping 30) or may be used to transmit data signals that have passed through switching complex 22 (as illustrated by grouping 32). Each card 20 may include one or more ports 24 and at least one physical or logical port 40 that communicates data signals to and receives data signals from switching complex 22.

Switching complex 22 includes an ATM switch fabric 50, a VT switch fabric 52, or other switching facilities. Further description of the functionality of switching complex 22 will focus primarily on switch fabric 50, but communication device 12 contemplates any suitable switching facilities to process data signals. Surrounding switch fabrics 50 and 52 are a collection of multiplexers, timeslot interchanges, or other switching, multiplexing, and/or signal processing functions that implement both pass-through and aggregation modes of communication device 12. Specifically, switching complex 22 includes a 1:2 bridge 60 that couples data signals communicated by ports 40 of cards 20 to timeslot interchange (TSI) 62 and TSI 64. Another TSI 66 is provided on the output of switch fabrics 50 and 52, and 2:1 selector 68 conveys pass-through or switched data signals received from TSIs 62 and 66, respectively, to the appropriate cards 20 for output. Bridge 60, selector 68, and TSIs 62, 64, 66 may be integral or separate components in hardware and/or software to implement the functions of switching complex 22.

In operation, communication device 12 receives a data signal, such as an ATM cell, on input port 24 of input card 20 in grouping 30. Bridge 60 receives the data signal from port 40 of input card 20 and either couples the data signal to TSI 62 in a pass-through mode or to TSI 64 in a switching mode. In the pass-through mode, selector 68 receives the data signal and provides it to the appropriate port 40 associated with output card 20 in grouping 32. Output card 20 then transmits the data signal using an appropriate output port 24. During this pass-through mode, TSI 62 and other components of communication device 22 may perform card and/or port identification using modified header bits to perform signal aggregation.

In the switching mode, bridge 60 couples the data signal to TSI 64 for mapping to a higher speed aggregate signal prior to presentation to switch fabrics 50 and 52. In a particular embodiment, TSI 64 may receive the data signal from port 40 of input card 20 in an STS-1 signal, and combine, map, or otherwise aggregate the STS-1 signal with other data signals received from other ports 24 and other cards 20 into a reduced number of higher speed aggregate signals for presentation to switch ports 70 of ATM switch fabric 50. In this manner, TSI 64 may take data signals 1:N from lower speed signals associated with cards 20, and aggregate these signals into a smaller number of higher speed signals 1:Y for switch fabric 50. Communication device 12 maintains an identification of input port 24 and/or input card 20 on which the data signal was received from network 14. This is accomplished by modifying unused, redundant, or otherwise available header bits of the data signal to temporarily encode card and/or port information for use by communication device 12 in conveying data signals to their destination. The term "header bits" includes all or any portion of headers, addressing fields, control fields, checksums, and other suitable portions of data signals that can be modified.

After identifying the destination for data signal, switch fabric 50 modifies header bits to identify output card 20 and/or associated output port 24, and passes the data signal to TSI 66. TSI 66 then transforms the aggregate signals received from ports 70 of switch fabric 50 and splits these signals back into lower speed signals for delivery to output card 20. In a particular embodiment, TSI 66 places the data signal into the appropriate timeslot associated with output card 20. Selector 68 receives the data signal and passes the data signal to output card 20. Output card 20 analyzes modified header bits that identify output port 24, and transmits the data signal on output port 24.

Figure 3:
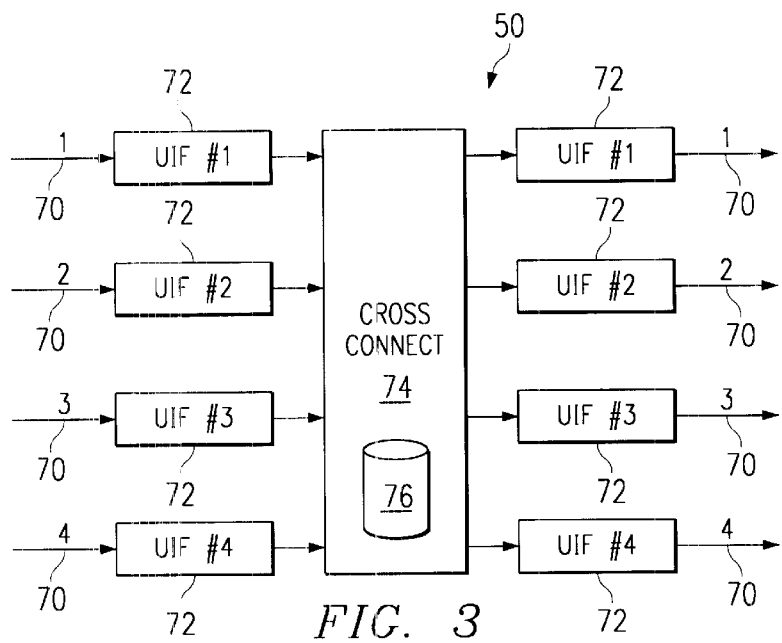
FIG. 3 illustrates a switch fabric of the communication device.

FIG. 3 illustrates in more detail switch fabric 50. In this embodiment, switch fabric 50 supports four switch ports 70. Each switch port 70 is associated with an interface 72, such as a level one or level two Utopia interface, that processes the received data signals and provides them to a cross-connect 74. Cross-connect 74 maintains a memory 76 having, for example, virtual path and virtual channel information that allows switch fabric 50 to associate a received data signal with output card 20 and output port 24. In a particular embodiment, cross-connect 74 examines modified header bits to identify input card 20 and/or input port 24, and using this information as well as the content of memory 76, cross-connect 74 determines output card 20 and/or associated output port 24. Cross-connect 74 then forwards the data signal to the appropriate interface 72 and switch port 70 for communication to output card 20.

In a particular embodiment, interfaces 72 implement the Utopia level two standards which provide for the identification of slots associated with each card 20. In this embodiment, since interfaces 72 automatically account for the identification of cards 20, header bits may only need to be modified to identify ports 24 of cards 20.

Figure 4:
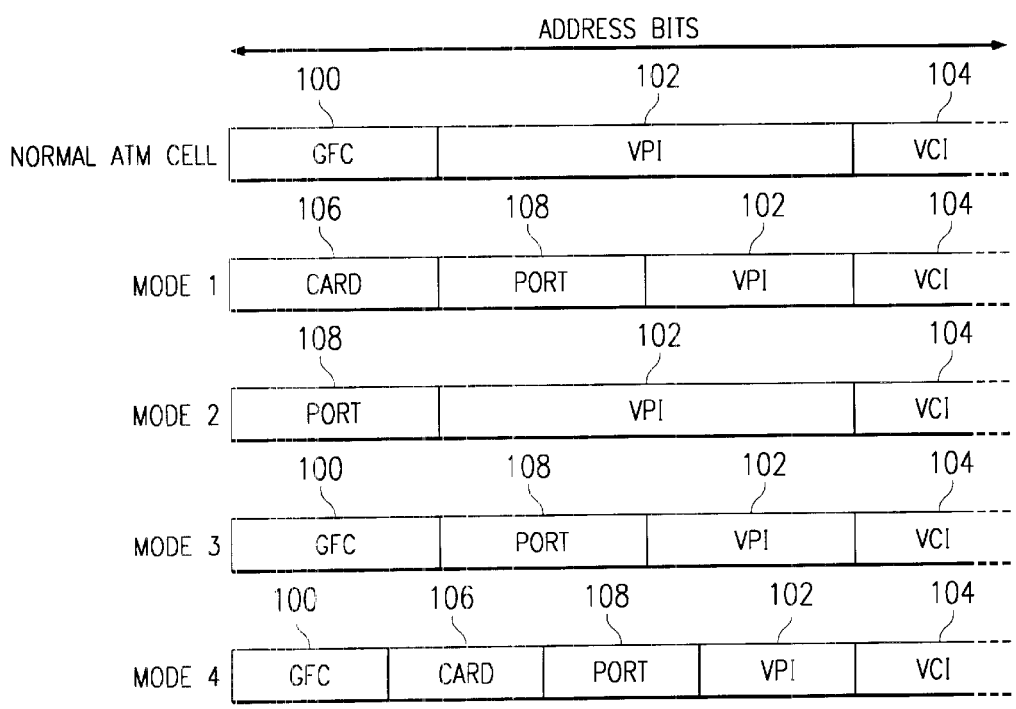
FIG. 4 illustrates the modification of header bits of an asynchronous transfer mode (ATM) cell in accordance with the present invention.

FIG. 4 illustrates the structure of the header bits of an ATM cell and the modes in which the header bits may be modified to encode card 20 and/or port 24 information. For an ATM cell, the "header bits" may include all or a portion of the generic flow control field (GFC) 100, virtual path identifier (VPI) 102, virtual channel identifier (VCI) 104, and any other bits in the five byte header of the ATM cell. In a first mode, communication device 12 modifies GFC 100 to include a card, timeslot, or slot identifier (referred to generally as card identifier 106) and a port identifier 108. In this mode, the length of VPI 102 or VCI 104 may be reduced to accommodate card identifier 106 and port identifier 108. In a second mode, port identifier 108 replaces GFC 100, and VPI 102 and VCI 104 remain unchanged. In a third mode, GFC 100 remains unchanged while port identifier 108 occupies a portion of VPI 102. In yet another mode, card identifier 106 and port identifier 108 occupy a portion of GFC 100 and VPI 102.

The modes described above are for illustrative purposes, and communication device 12 contemplates any arrangement or number of information or bits to be modified to include card identifier 106 and/or port identifier 108 in header bits of a data signal.

Figure 5:
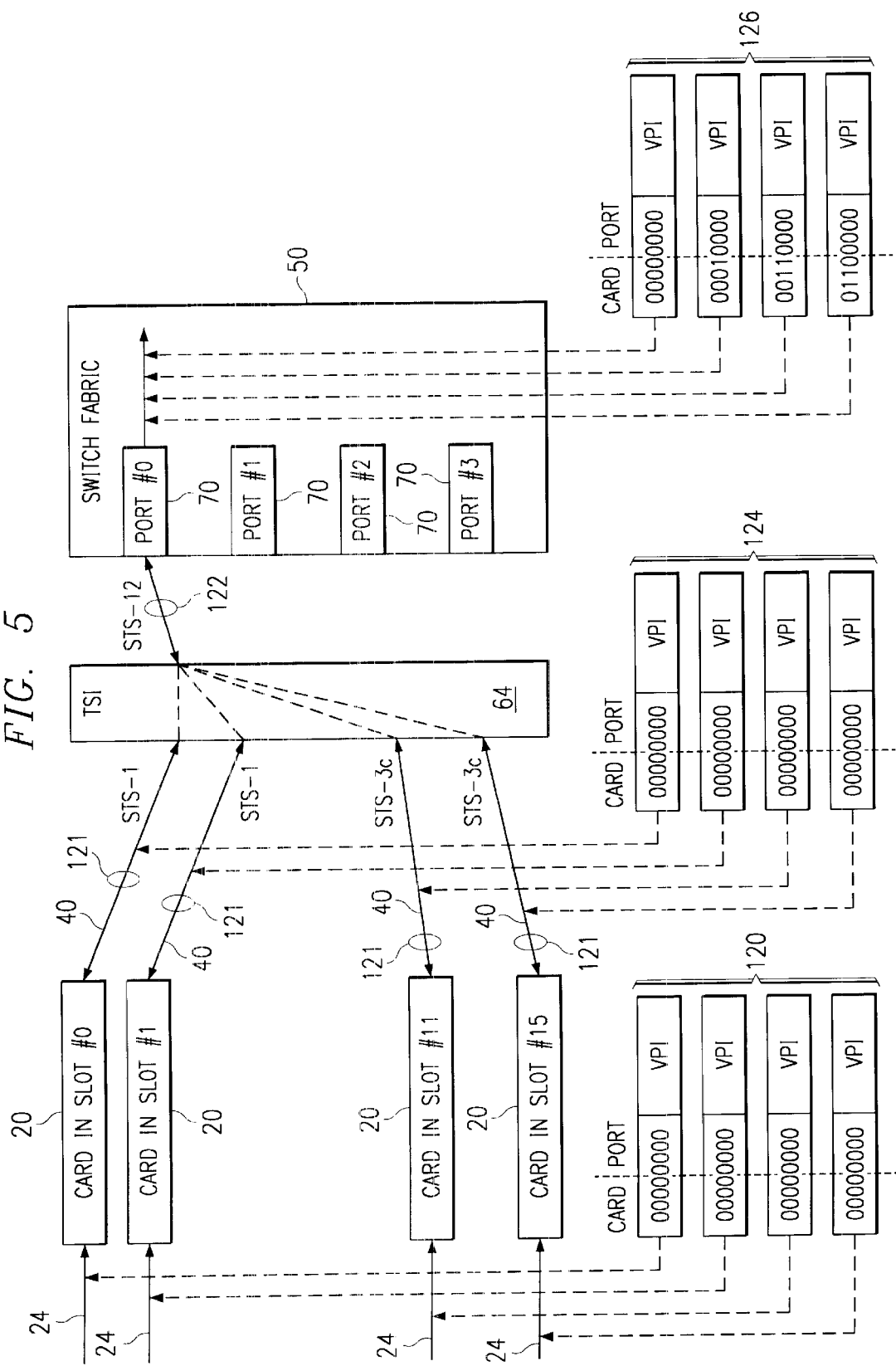
FIG. 5 illustrates the aggregation of data signals from multiple interface cards using modified header bits.

FIG. 5 illustrates one embodiment of communication device 12 that modifies header bits to identify data signals from cards 20 for aggregation by TSI 64. This example implements the first mode described with reference to FIG. 4, but may implement any other appropriate mode to include card identifier 106 in header bits. Data signals received by cards 20 include header bits 120 that do not identify input cards 20 or associated input ports 24. Data signals are then passed to TSI 64 as lower speed signals 121 (e.g., STS-1, STS3c). TSI 64 then maps lower speed signals 121 received from ports 40 of cards 20 to a higher speed aggregate signal 122 for communication to switch port 70 of switch fabric 50.

In a particular embodiment, cards in slots #0 and #1 communicate STS-1 signals to TSI 64 and cards in slots #11 and #15 communicate STS-3c signals to TSI 64. Since this example does not modify header bits to identify ports 24, header bits 124 remain unchanged. TSI 64 then maps the STS-1 signals to any STS location within the higher rate aggregate signal 122, such as an STS-12 signal. In a particular embodiment, the STS-3c signals map on concatenated boundaries within the higher rate STS-12. Therefore, an STS-3c maps to STS locations #0, #3, #6, or #9 within the STS-12. In this case, STS-1 signals from cards in slots #0 and #1 are mapped to STS locations #0 and #1, respectively, of the STS-12 signal. STS-3c signals from cards in slots #11 and #15 are mapped to STS locations #3 and #6, respectively, of the STS-12 signal. Since these interfaces support STS-3c concatenated signal formats, STS locations #4, #5, #7, and #8 of the STS-12 signal are automatically occupied by the respective STS-3c signals and not assigned otherwise. STS location #2 of the STS-12 signal is not used since the concatenated signals must be mapped on concatenated boundaries of aggregate signal 122. Any other card 20 that only needs a single STS-1 signal may use STS location #2 of the STS-12 signal.

Once TSI 64 aggregates lower speed signals 121 from cards 20 into aggregate signal 122, switch fabric 50 receives aggregate signal 122 on switch port 70, designated in this example as switch port #0. Switch port #0 of switch fabric 50 modifies the four most significant bits of the incoming STS-12 signals according to the lower speed signal 121 location of each STS within the STS-12, as illustrated by header bits 126. Therefore, switch fabric 50 modifies the four most significant bits to map the specific STS position in the STS-12. In the example shown in FIG. 5, slot #0 maps to STS #0 (0000), slot #1 maps to STS #1 (0001), slot #11 maps to STS #3 (0011), and slot #15 maps to STS #6 (0110). These assignments are reflected in card identifier 106 of header bits 126. Therefore, communication device 12 maximizes utilization of switch port 70 of switch fabric 50 by aggregating lower speed data signals 121 from multiple cards 20 for presentation as aggregate signal 122 to switch fabric 50.

Figure 6:
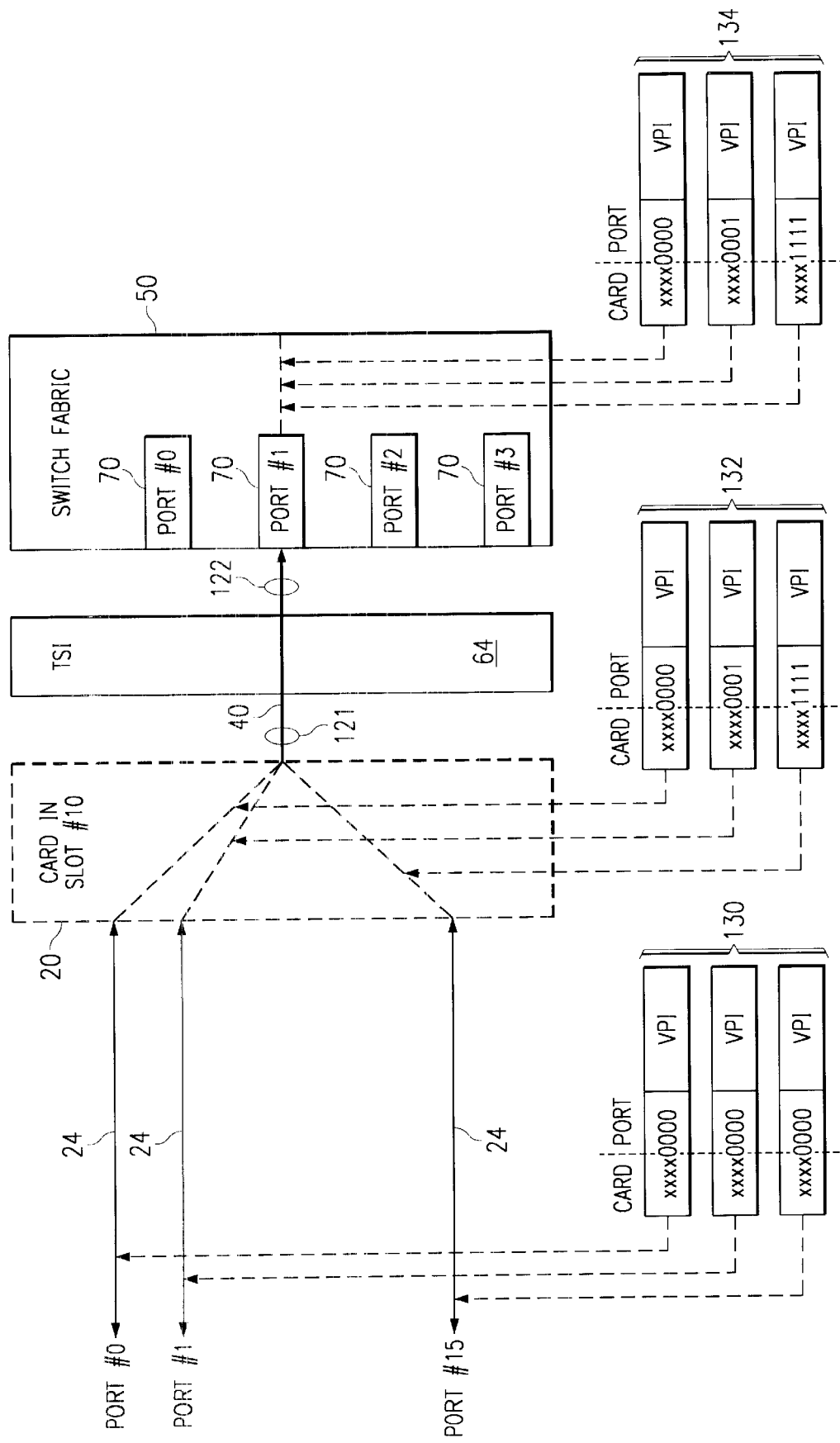
FIG. 6 illustrates the aggregation of data signals from multiple ports of an interface card using modified header bits.

FIG. 6 illustrates the modification of header bits to aggregate or combine data signals from multiple ports 24 of a single card 20. Card 20 is located in slot #10 and, as an example has a maximum of sixteen DS-1 cell relay ports 24 mapped to an STS-1 signal on port 40. Data signals enter card 20 from network 14 with unmodified header bits 130. The four most significant bits of header bits 130 may remain unchanged as GFC 100, since this example does not modify header bits to identify card 20. However, card 20 modifies the next four bits to identify port 24 of card 20 that received the particular data signal, as shown in header bits 132. TSI 64 receives an STS-1 signal from port 40 and passes this signal to switch port 70 on switch fabric 50 as aggregate signal 122. Switch fabric 50 then analyzes the modified header bits 134 to perform its functions.

Figure 7:
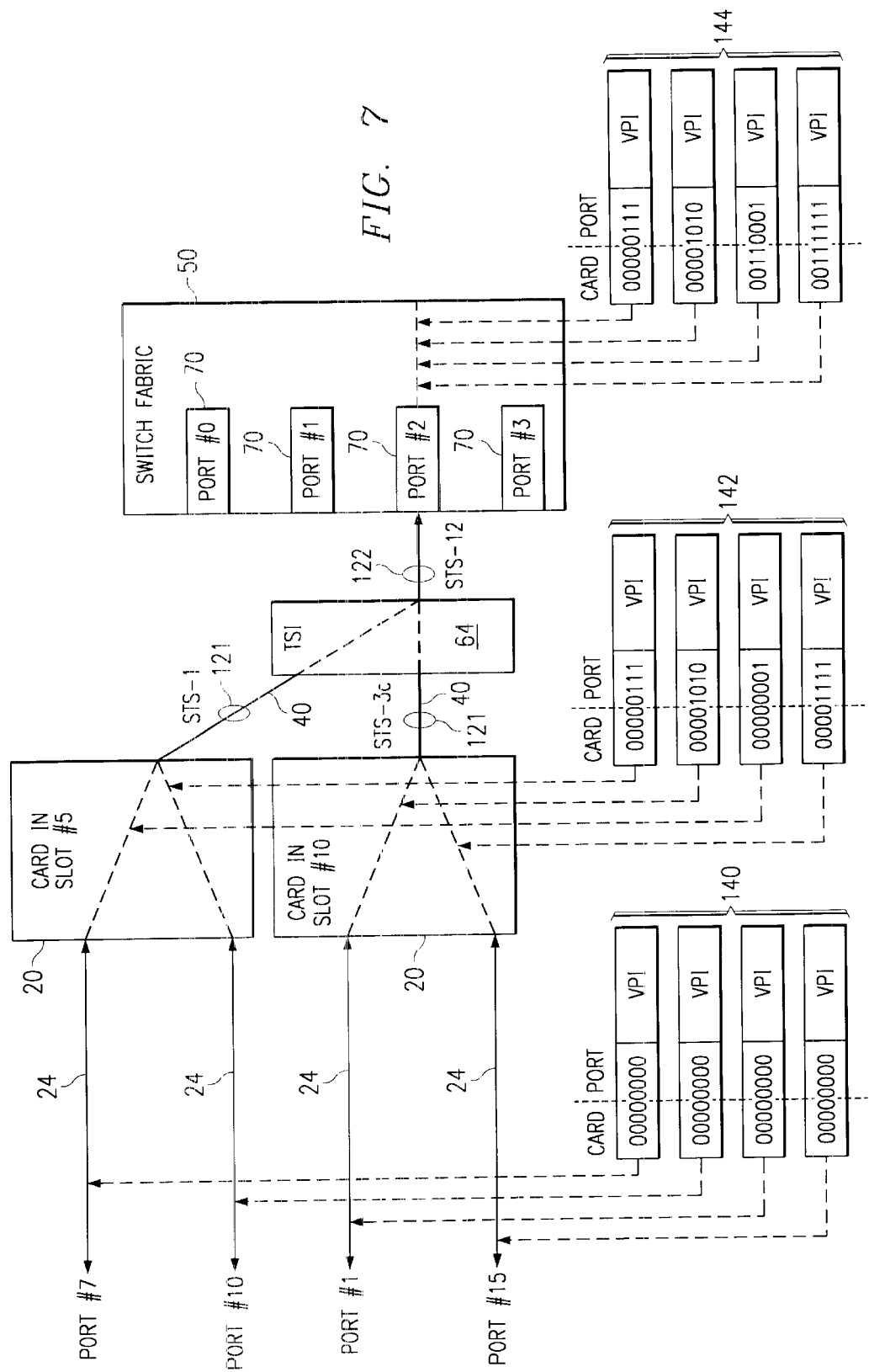
FIG. 7 illustrates the aggregation of data signals from multiple ports of multiple cards using modified header bits.

FIG. 7 illustrates modification of header bits to identify both card 20 and port 24 for each data signal. In this embodiment, the card in slot #5 receives data signals on ports #7 and #10 with unmodified header bits 140. The card in slot #5 then modifies header bits 142 to encode port identifiers 108 and passes lower speed data signal 121 to TSI 64 using port 40. Similarly, the card in slot #10 receives data signals on ports #1 and #15, and modifies header bits 142 to include port identifier 108. The card in slot #10 passes lower speed data signal 121 to TSI 64 using port 40. At this stage, modified header bits 142 identify ports 24 associated with data signals passed to TSI 64.

TSI 64 places lower speed data signals 121 from cards in slots #5 and #10 into associated timeslots of aggregate signal 122. In the specific example where aggregate signal 122 is an STS-12 signal, lower speed data signal 121 from the card in slot #5 is an STS-1 signal, and lower speed data signal 121 from the card in slot #10 is an STS-3c signal, TSI 64 places the STS-1 signal and the STS-3c signal in locations #0 and #3, respectively, of the STS-12 signal. Switch fabric 50 receives aggregate signal 122 on port 70 and modifies header bits to encode a card identifier 106. At this stage, modified header bits 144 include both card identifier 106 and port identifier 108. Switch fabric 50 uses this information to perform its functions.

Figure 8:
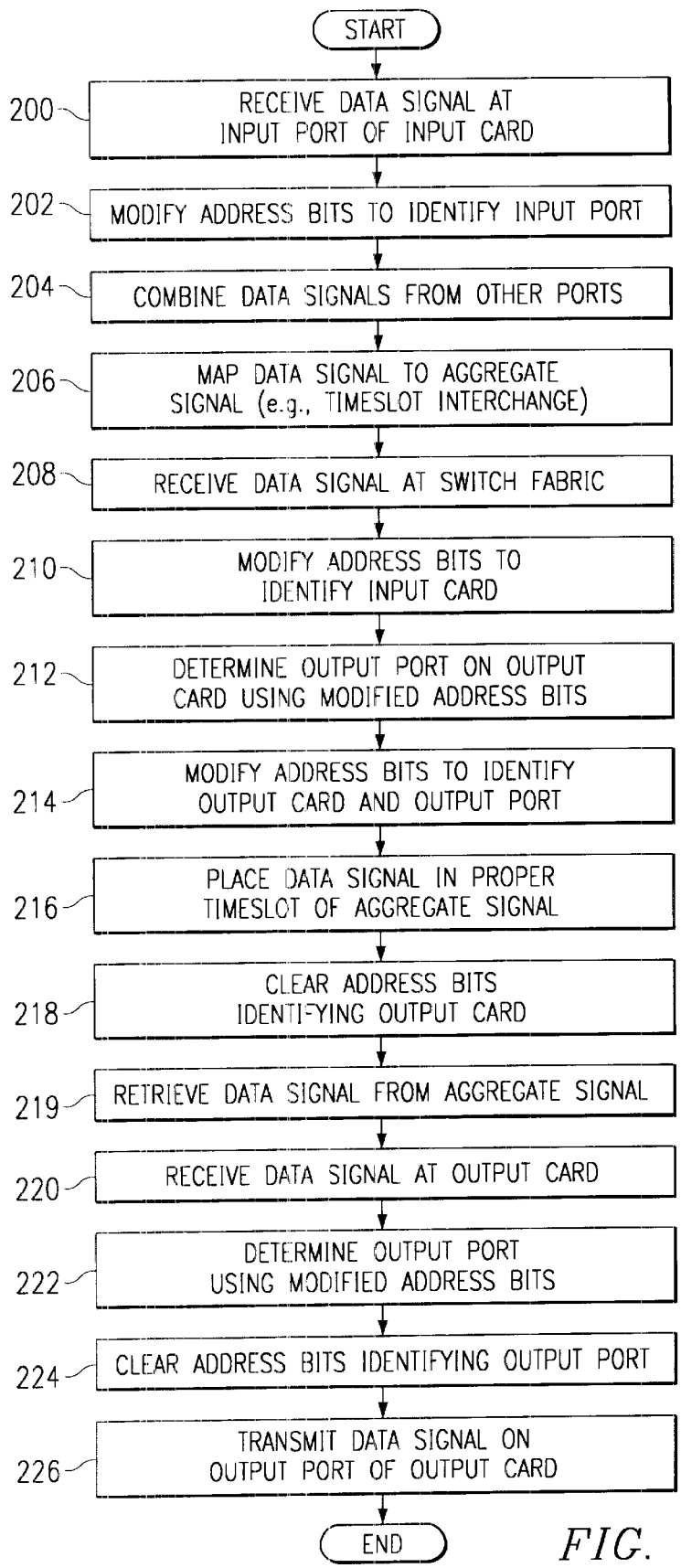
FIG. 8 illustrates a flow chart of a method for communicating data signals using modified header bits.

FIG. 8 illustrates a flowchart of a method of operation of communication device 12. Although this method modifies header bits for both card and port identification, communication device 12 contemplates modified header bits to identify cards 20 and/or associated ports 24. The method begins at step 200 where input card 20 receives the data signal at input port 24. Input card 20 then modifies header bits to identify input port 24 at step 202. If appropriate, input card 20 combines data signals received on its other ports 24 into a lower speed signal 121 (e.g., STS-1, STS-3c, etc.) at step 204. TSI 64 receives lower speed signals 121 from one or more cards 20 and produces aggregate signal 122 at step 206. At step 208, switch fabric 50 receives the data signal now included in aggregate signal 122 at a designated switch port 70. If appropriate, switch fabric 50 modifies header bits to identify input card 20 at step 210. Using modified header bits and other information maintained in memory 76, switch fabric 50 then determines output port 24 and output card 20 for the data signal at step 212. Switch fabric 50 modifies header bits to identify output card 20 and output port 24 at step 214.

Switch fabric 50 places data signal in the proper timeslot of aggregate signal 122 for delivery to output card 20 at step 216. Either before or after placing data signal into the timeslot, switch fabric 50 or TSI 66 may clear modified header bits that identify output card 20 at step 218. TSI 66 retrieves or splits out lower speed signal 121 containing the data signal from aggregate signal 122 at step 219. Output card 20 receives the data signal at step 220, and determines output port 24 using modified header bits at step 222. Output card 20 clears header bits that identify output port 24 at step 224, and transmits the data signal on output port 24 at step 226.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication device comprising:
   a first card operable to receive a data signal at an input port, the first card further operable to modify a plurality of header bits of the data signal to identify the input port;
   a switch fabric coupled to the first card and operable to receive the data signal, the switch fabric further operable to modify the header bits to identify an output port of a second card; and
   a second card coupled to the switch fabric and operable to transmit the data signal on the output port, the switch fabric further operable to modify the header bits of the data signal to identify the first card, determine that the data signal is to be communicated to the output port of the second card, and modify the header bits to identify the second card.

2. A method for communicating data signals from a first card to a second card of a communication device, comprising:

receiving a data signal at an input port of a first card;

modifying a plurality of header bits of the data signal to identify the input port of the first card;

communicating the data signal from the first card to a switch fabric;

modifying the header bits to identify the first card;

determining that the data signal is to be communicated to an output port of a second card;

modifying the header bits to identify the second card;

modifying the header bits to identify the output port of the second card; and communicating the data signal to the output port of the second card.

3. A communication device, comprising:

a first card operable to receive a data signal at an input port, the first card further operable to modify a plurality of header bits of the data signal to identify the input port;

a timeslot interchange coupled to the first card and operable to map the data signal to a higher speed signal having a plurality of other data signals from a plurality of other input ports to produce an aggregate signal;

a switch fabric coupled to the timeslot interchange and operable to receive the data signal in a timeslot associated with the first card, the switch fabric further operable to modify the header bits to identify an output port of a second card; and the second card operable to transmit the data signal on the output port.

4. The communication device of claim 3, wherein the data signal comprises an asynchronous transfer mode (ATM) cell.

5. The communication device of claim 3, wherein:

the data signal comprises an asynchronous transfer mode (ATM) cell; and the header bits of the data signal comprise a virtual path identifier, a virtual channel identifier, or generic flow control bits.

6. The communication device of claim 3, wherein the aggregate signal comprises at least four other data signals from four separate input ports of the communication device.

7. The communication device of claim 3, wherein the switch fabric is further operable to:

modify the header bits of the data signal to identify the first card;

determine that the data signal is to be communicated to the second card; and modify the header bits to identify the second card.

8. The communication device of claim 3, wherein the communication device comprises an add/drop multiplexer coupled to an optical network.

9. A method for communicating data signals from a first card to a second card of a communication device, comprising:

receiving a data signal at an input port of a first card;

modifying a plurality of header bits of the data signal to identify the input port;

mapping the data signal to a higher speed signal containing data signals from a plurality of other input ports to produce an aggregate signal;

communicating the aggregate signal to a switch port of a switch fabric;

determining an output port of a second card;

modifying the header bits to identify the output port of the second card; and communicating the data signal to the output port of the second card.

10. The method of claim 9, wherein the data signal comprises an asynchronous transfer mode (ATM) cell.

11. The method of claim 9, wherein:

the data signal comprises an asynchronous transfer mode (ATM) cell; and the header bits of the data signal comprise a virtual path identifier, a virtual channel identifier, or generic flow control bits.

12. The method of claim 9, wherein the aggregate signal comprises at least four other data signals from four separate input ports of the communication device.

13. The method of claim 9, further comprising:

receiving the data signal in a first timeslot of the aggregate signal associated with the first card;

modifying the header bits to identify the first card;

determining the second card;

modifying the header bits to identify the second card; and communicating the data signal to the second card.

14. The method of claim 9, further comprising:

clearing the modified header bits; and transmitting the data signal on the output port of the second card.

15. The method of claim 9, wherein the communication device comprises an add/drop multiplexer coupled to an optical network.

16. An interface card of a communication device, comprising:

a first port operable to receive a data signal having a plurality of header bits;

a processor coupled to the first port and operable to modify the header bits to identify the first port; and a second port operable to transmit the data signal with the modified header bits, wherein the second port transmits the data signal to a timeslot interchange for aggregation with data signals from a plurality of other input ports.

17. A method for communicating data signals, comprising:

receiving, at a first port of an interface card of a communication device, a data signal having a plurality of header bits;

modifying the header bits to identify the first port; and transmitting the data signal with the modified header bits on a second port of the interface card, wherein the data signal is transmitted to a timeslot interchange for aggregation with data signals from a plurality of other input ports.

* * * * *